United States Patent [19]
Hollingworth, Jr.

[11] Patent Number: 5,082,307
[45] Date of Patent: Jan. 21, 1992

[54] MINI BOAT/CAMPING TRAILER

[76] Inventor: Jack Hollingworth, Jr., Big Sugar Creek Farm, Powell, Mo. 65730

[21] Appl. No.: 467,930

[22] Filed: Jan. 22, 1990

[51] Int. Cl.$^5$ .............................................. B60G 3/28
[52] U.S. Cl. ................................ 280/699; 280/414.1; 280/720
[58] Field of Search ................. 280/414.1, 456.1, 482, 280/7.12, 494, 699, 720, 719; 403/57

[56] References Cited

U.S. PATENT DOCUMENTS

| | | | |
|---|---|---|---|
| 2,374,835 | 5/1944 | Sampsell | 280/414.1 |
| 3,337,243 | 8/1967 | Rued | 280/720 |
| 3,348,874 | 10/1967 | Gorman | 280/414.1 |
| 3,680,887 | 8/1972 | Docker | 280/699 |
| 3,860,256 | 1/1975 | Jackson et al. | 280/414.1 |
| 3,989,264 | 11/1976 | | 280/414.1 |
| 3,989,266 | 11/1976 | Foster | 280/414.1 |
| 4,103,926 | 8/1978 | Johnson et al. | 280/414.1 |
| 4,232,990 | 11/1980 | Pierce | 280/414.1 |
| 4,331,346 | 5/1982 | Walters | 280/414.1 |
| 4,577,876 | 3/1986 | Harris | 280/7.12 |
| 4,714,265 | 12/1987 | Franklin | 280/482 |
| 4,754,998 | 7/1988 | LeJuerrne | 280/414.1 |

FOREIGN PATENT DOCUMENTS

| | | | |
|---|---|---|---|
| 0113154 | 7/1984 | European Pat. Off. | 280/656 |
| 0400834 | 11/1933 | United Kingdom | 280/415.1 |
| 8904260 | 5/1989 | World Int. Prop. O. | 280/494 |

OTHER PUBLICATIONS
1990 Sears Boat Catalogue.

Primary Examiner—Charles A. Marmor
Assistant Examiner—Mitchell Bompey
Attorney, Agent, or Firm—Shlesinger, Arkwright & Garvey

[57] ABSTRACT

A towed vehicle comprises a longitudinal frame having front and rear portions; a hitch for securing the front portion to a towing vehicle; a first member disposed transversely across an intermediate portion of the frame adjacent the rear portion and secured thereto, the first member and the longitudinal frame forming a cross configuration; first and second cantilever springs each having one end secured to respective ends of the first member and disposed toward the rear portion; an axle, including ground engaging apparatus, secured to the other respective ends of the first and second cantilever springs; first and second stabilizer members each having one end secured to respective ends of the first member and disposed toward the rear portion and the other ends being secured to the axle, the first and second cantilever springs and the first and second stabilizer members respectively forming an "X"-shaped configuration when viewed along an axis of the axle; a second member secured adjacent the end portion and disposed away from the first member; and a bed secured to the first and second members.

12 Claims, 5 Drawing Sheets

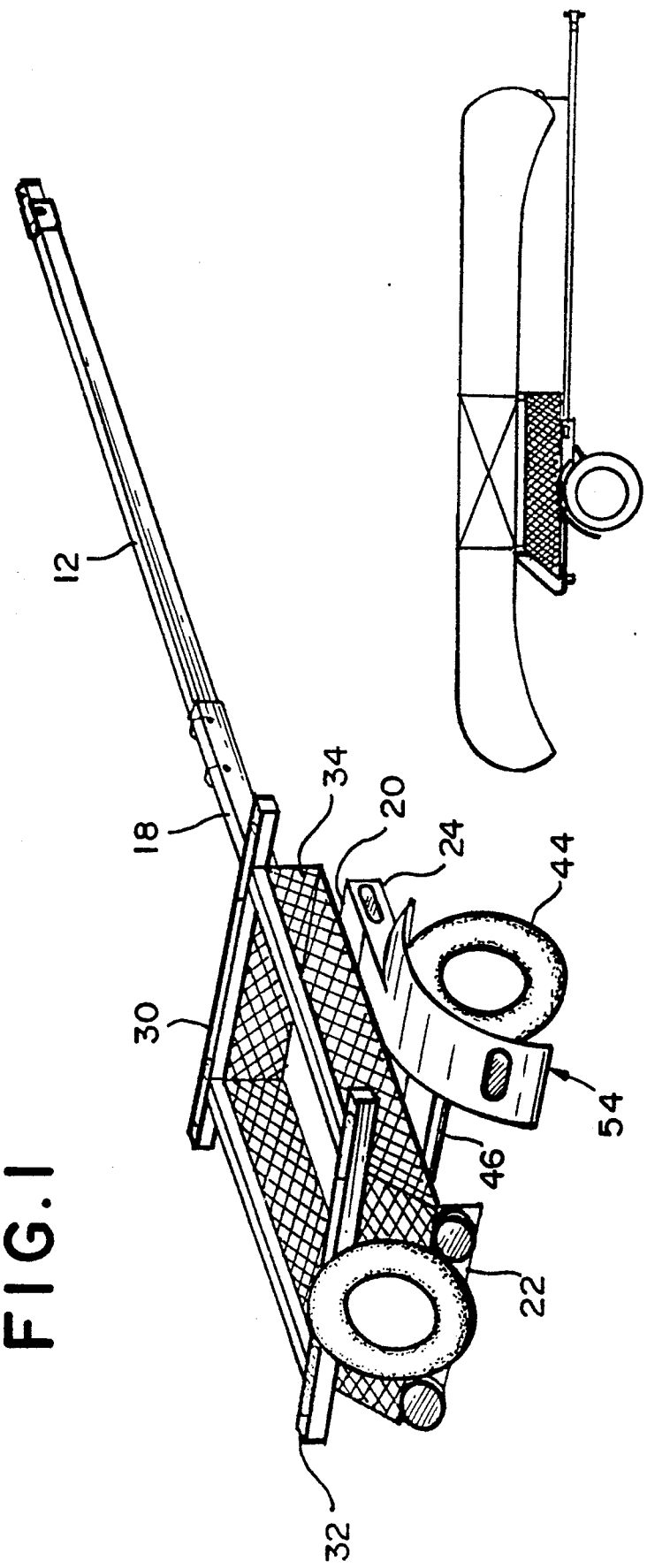

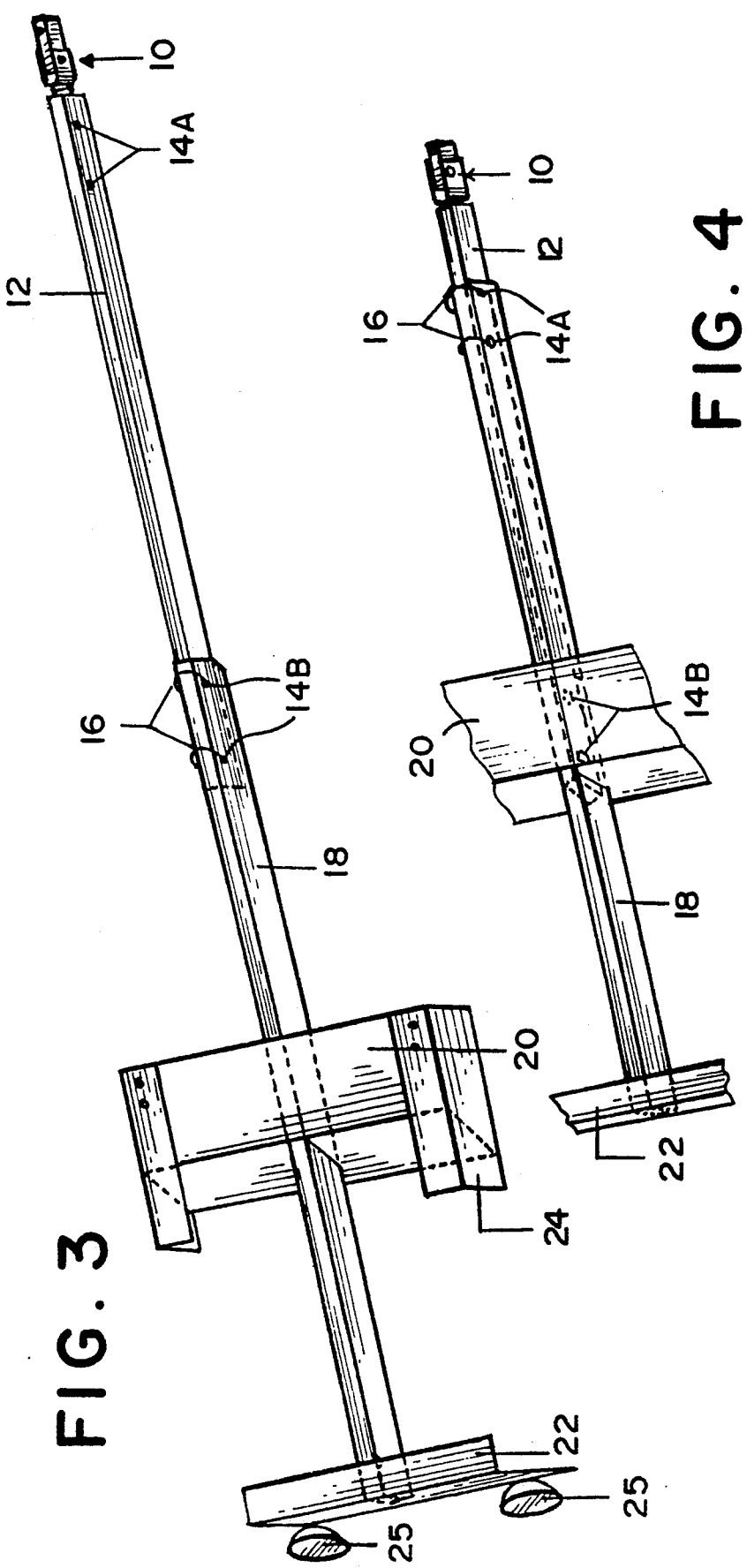

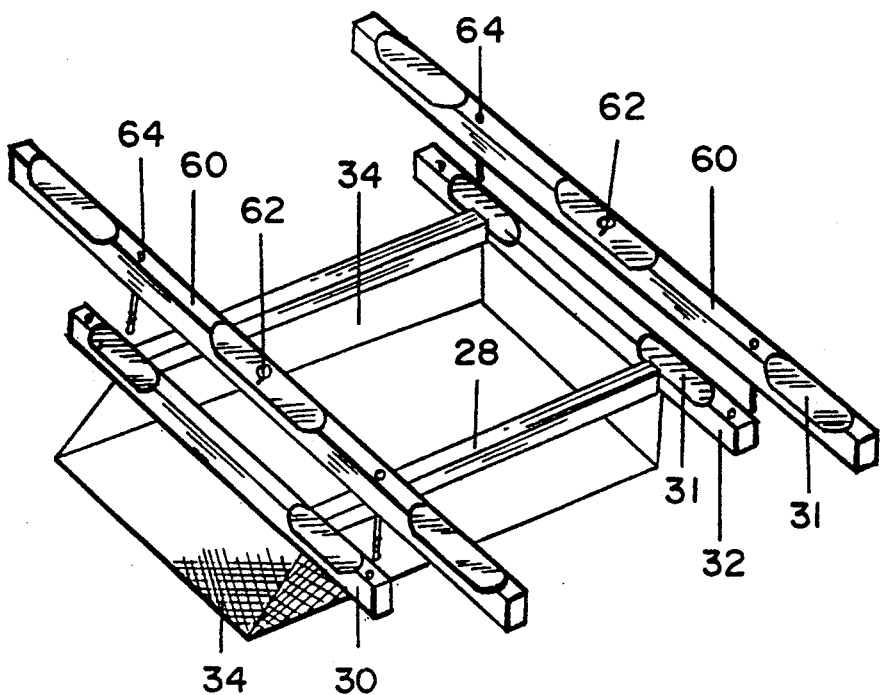
FIG. 9
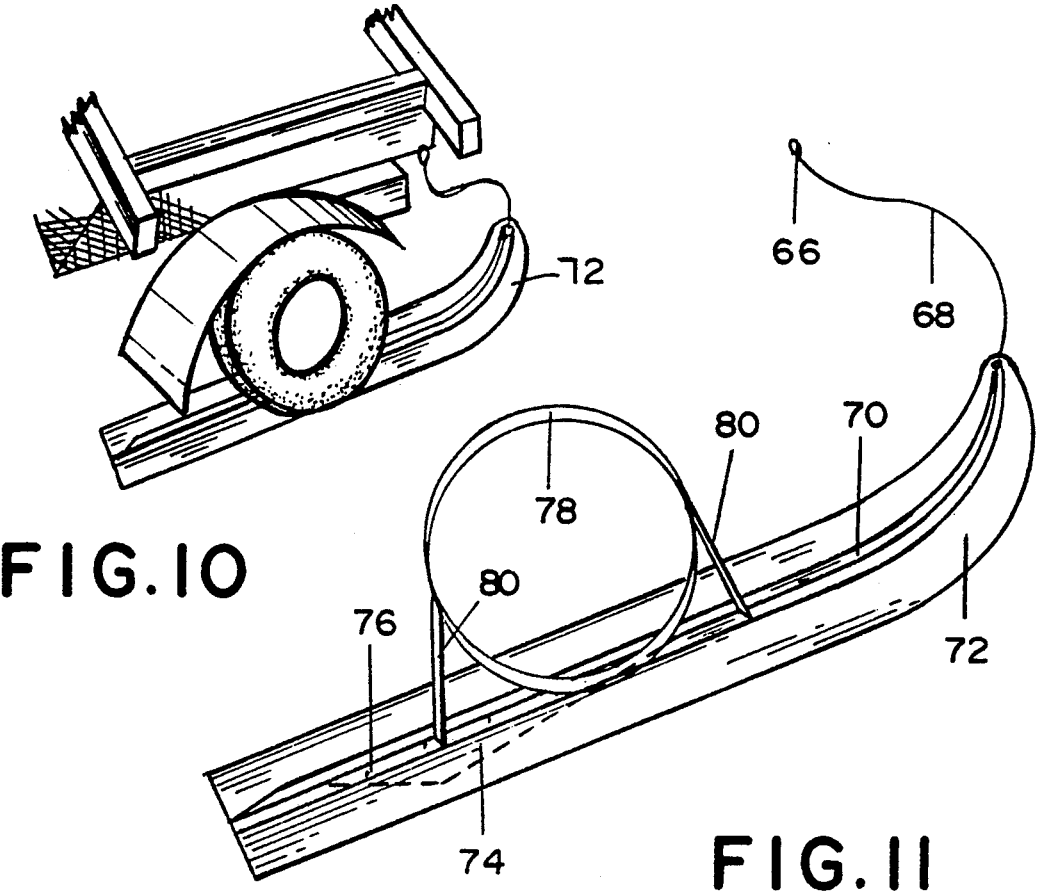
FIG. 10
FIG. 11

MINI BOAT/CAMPING TRAILER

FIELD OF THE INVENTION

This small trailer was invented to carry a canoe or small water recreation vehicle and associated camping equipment. It is of such size that it can be towed by a motorcycle of the touring size, small compact cars, convertible vehicles, and off-road all-terrain vehicles (ATV).

BACKGROUND OF THE INVENTION

Heretofore trailer for transporting boats and water recreation vehicles were of such size and weight that towing them with vehicles such as motorcycles, ATV's, and small cars was not practical. There are hundreds of thousands of motorcyclists who ride the larger touring motorcycle, thousands of ATV owners and untold numbers of small sports car and compact car owners, who are also campers and water sports enthusiasts. Until now, their participation in camping and water recreation has been directed into one or two directions. They would arrive at their lake destinations in their small cars or on their motorcycles and would be at the mercy of marinas for expensive boat or canoe rentals, if available, or they would have to take their full sized cars or pickups to tow their large, heavier trailers to participate in their water recreation.

The present invention allows these persons the freedom of using their most favored vehicle, be it a motorcycle, sports car, or ATV, to tow their canoe or small water vehicle and camping equipment. ATV (all-terrain vehicles) sportsmen use their vehicles to get into unaccessible backwoods areas where other less mobile sportsmen are not present. In many instances, these areas are adjacent to magnificent lakes. The miniboat/camping trailer according to the present invention was designed to be towed by ATV's. Its construction is rugged and agile to go anywhere an ATV can be maneuvered, while carrying the sportsman's camping needs as well as his canoe. This trailer is also ideal to be used in its shortened mode when the sportsman is using it only as a utility trailer to transport his camping needs and any wild game he may have killed from these backwoods hunting areas.

This new and innovative miniboat/camping trailer lends itself to the canoeing enthusiasts in that by its design it makes the handling and transporting of the canoe and its associated equipment far easier for the older or infirmed canoeist. The present and most accepted method of transporting a canoe is the "car top carrier". This demands that the canoe be lifted to the top of the car top carrier crossbars, which are approximately five feet or more from the ground. This trailer has its canoe carrying crossbars less than two and one half feet above the ground, thus enabling the canoeist to easily load the canoe without the physical straining of high lifting; and at the same time affording him additional space for carrying associated equipment such as an outboard motor and camping equipment, that car top carriers do not accommodate.

This miniboat/camping trailer also incorporates in its design the feature of a retractable tongue. Most of the foregoing discussion of this trailer assumed the owner would be using the trailer primarily for the transportation of a canoe, small boat, or other water recreational vehicle. However, by the use of the retractable tongue, the owner can shorten the trailer to less than one-half its original length and the trailer becomes a very versatile utility trailer for transporting anything accommodated by its cargo bed. This makes this trailer even more practical for the individual owner.

OBJECTS AND SUMMARY OF THE INVENTION

It is an object of the present invention to provide a miniboat/camping trailer that is small enough to be towed by motorcycles of 1000 cc or larger, thus allowing the touring class of motorcyclist, who may also be an avid sportsman, to enjoy motorcycling to their favorite lake or campground with their canoe or water jet ski, and at the same time to provide ample cargo space for camping equipment. Practically all trailers on the market now are much larger and heavier, thus requiring full sized cars or pickups to accomplish the same as functions this smaller miniboat/camping trailer.

It is another object of the present invention to allow persons who own convertible sports cars, jeeps, or jeep type vehicles with convertible tops to transport, by using the trailer of the present invention, a canoe and associated equipment that they could not transport on their vehicle convertible tops. The ATV sportsman is a perfect example of a group of people who can enjoy extended advantages of their ATV's by the use of the miniboat/camping trailer. These sportsmen use their ATV's to reach areas of hunting and fishing that are not readily accessible by conventional vehicles.

It is still another object of the present invention to provide a miniboat/camping trailer that is small and ruggedly built so that it may be towed anywhere that an ATV can go. The ATV model of this miniboat/camping trailer has its normal sized highway tires and wheels replaced with wide flotation tires to allow it to travel over soft or marsh type terrain that can be maneuvered by an ATV. The cargo bed that supports the canoe or boat has sufficient capacity to accommodate 400 pounds of load which would be a distinct advantage to the hunter who bagged a 400 lb. trophy buck and needed to transport his kill out of the backwoods.

It is an object of the present invention to provide a miniboat/camping trailer with load rails that are only two and one half feet from the ground, making the loading and unloading of a canoe a safe and easy task for the person who would otherwise miss the sport due to the difficulty of loading the canoe on a car top carrier. While we think of the sportsman as being strong and in the "prime of life," we must be aware of many older people who enjoy the sport of canoeing and fishing. This person many times lacks the strength to place a canoe up on the rack on top of his vehicle, which is the present standard for the transportation of individual canoes.

It is another object of the present invention to provide a miniboat/camping trailer that is designed with a retractable tongue which allows the trailer to be shortened to less than half its normal length. When the owner needs a utility trailer to haul articles other than a canoe or small boat, all that is required is to pull two small spring locking pins, slide the tongue into itself, replace the pins and he has a compact utility trailer which greatly increases the practicability of this trailer over most boat trailers, whose sole function is to transport a boat.

Further objects and advantages of my miniboat/camping trailer will become apparent from a consideration of the drawings and descriptions thereof.

BRIEF DESCRIPTION OF THE DRAWINGS

FIG. 1 is an overall perspective view of my miniboat/camping trailer invention.

FIG. 2 is a side view of the miniboat/camping trailer of FIG. 1, depicting one of its functions of transporting a canoe.

FIG. 3 shows the complete main frame with the trailer tongue in the extended position.

FIG. 4 is a partial view of the main frame exemplifying the trailer tongue in the retracted position.

FIG. 9 shows one modification of the trailer for a two canoe attachment.

FIG. 10 is a perspective view of another modification of the miniboat/camping trailer embodying the use of snow skis.

FIG. 11 is a detailed view of the snow ski attachment.

DETAILED DESCRIPTION OF THE INVENTION

For the following description of the physical structure of the miniboat/camping trailer, please refer to FIGS. 1 through 11. FIGS. 1 and 2 are general drawings of the miniboat/camping trailer in its entirety.

Figure 5:
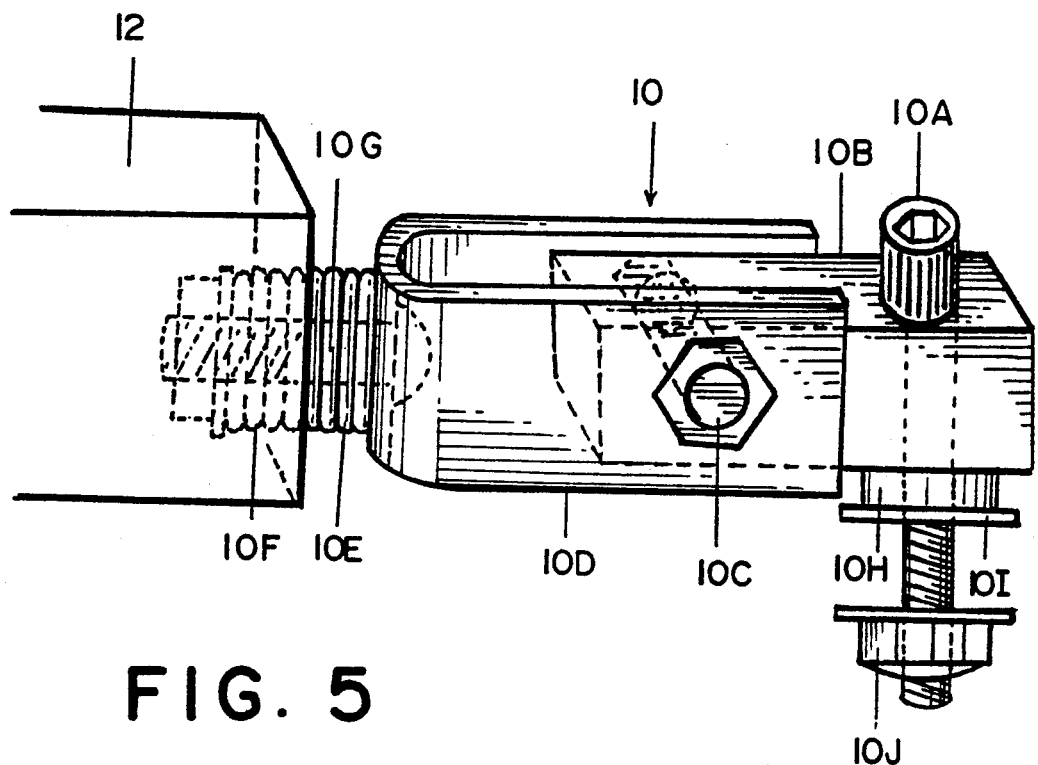
FIG. 5 is a detailed drawing of the hitch assembly.

FIG. 5 is a detailed view of an articulating hitch assembly 10. A hitch block 10B is a short rectangular steel block drilled vertically to accommodate a high strength steel bolt 10A to attach the hitch and trailer to a towing vehicle. A steel bolt 10C extends through a horizontally drilled hole in the hitch block 10B and through a clevis 10D which is attached to the extendable portion of the trailer tongue 12 by a steel bolt 10G. Rubber shock bushings 10E and 10F are used around the clevis bolt 10G.

FIGS. 3 and 4 depict the main frame 20 and the tongue assemblies 12 and 18. The telescoping tongue 12 is a rectangular steel tubing slightly smaller than the main frame tongue 18, so that the telescoping of the tongues 12 and 18 can be accomplished. The tongues 12 and 18 are drilled completely through both tongues at 14A and 14B and the tongues are securely fastened by spring safety locking pins 16 at the desired length of tongue. The main frame tongue 18 extends rearwardly through the main frame 20 and terminates at the back frame 22, where it is welded in place. The main frame 20 is fabricated from a rectangular sheet of lightweight steel plate, bent 90° down for the forward portion of the main frame. The rear of the main frame 20 is bent down at 45°, and both forward and rear portions of the main frame 20 are bent along the long dimension of the steel plate. Two end doublers 24 are bent to 90° and welded to each end of the mainframe 20 to create a small and lightweight, yet strong box frame. Close fit holes are cut through the turn-down portions of the main frame 20 so that the main frame tongue 18 may protrude through to the rear frame. The main frame 20 is welded to the main frame tongue 18 at several places under the main frame 20. The back frame 22 is fabricated of lightweight steel plate bent 90°, with the horizontal portion of the bend approximately ½ the width of the vertical part of the back frame.

Figure 6:
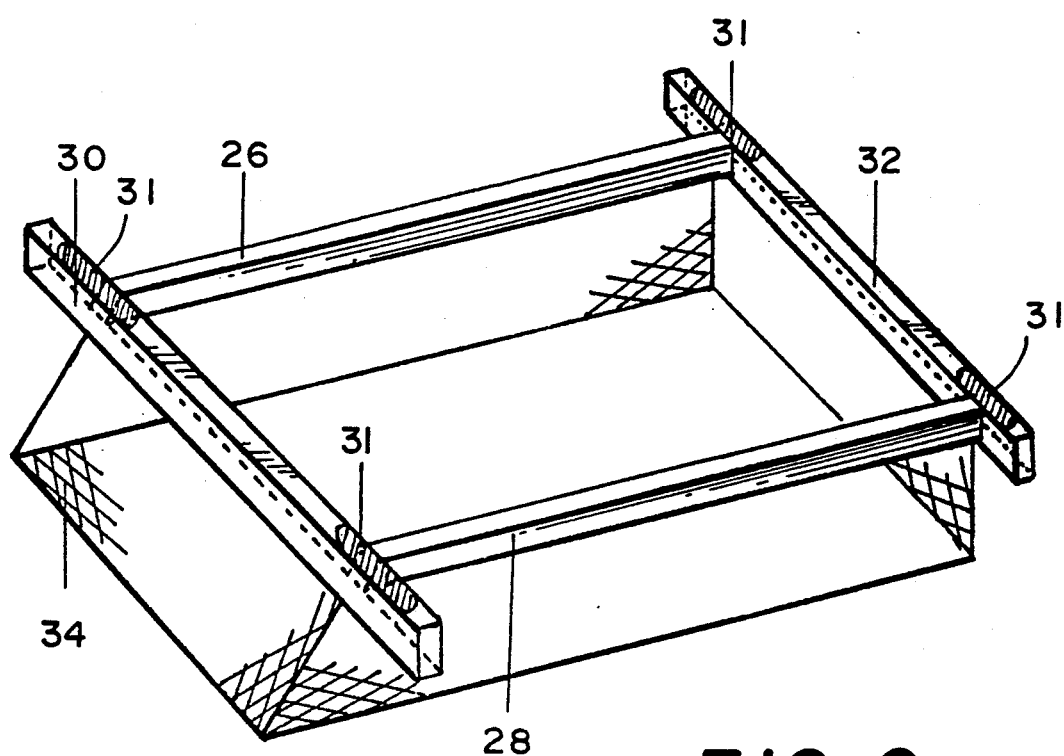
FIG. 6 is a perspective view of the miniboat/camping trailer cargo bed and canoe support rails.

FIG. 6 teaches the construction of the cargo bed 34 and canoe supports 30 and 32. The cargo bed 34 is constructed of medium weight expanded metal. The expanded metal is pattern cut at the corners and the sides are bent upwards at 90° and spot welded to form a rigid expanded metal bed, rectangular in shape with the rear end sloped forward.

The cargo bed rails and canoe supports 26, 28, 30 and 32 are constructed of oak hardwood of sufficient dimension to form a rail around the top perimeter of the cargo bed 34, with the front and rear canoe supports 30 and 32 long enough to adequately support the breadth of a canoe. A slot is sawed in the bottom center of the rails 26, 28, 30 and 32, so that the rails can slide down over the top of the expanded metal cargo bed 34. Wood screws are driven through the lower outer portion of the oak rails, through the expanded metal and into the inner side of the oak rail to hold the rails fast to the cargo bed. Side oak rails 26 and 28 are attached to the front and back rails 30 and 32 with simple metal 90° angle brackets and bolts.

The front and rear cargo bed rails 30 and 32 have "rubber like" scuff pads 31 screwed to the rails at the points of contact of the inverted canoe with the cargo rails.

The completed cargo bed 34 is attached to the mainframe 20 and the back frame and tail-light bracket 22 at the bottom four corners of the cargo bed where it contacts the main frame 20 and the back frame 22 with four short carriage bolts.

Figure 7:
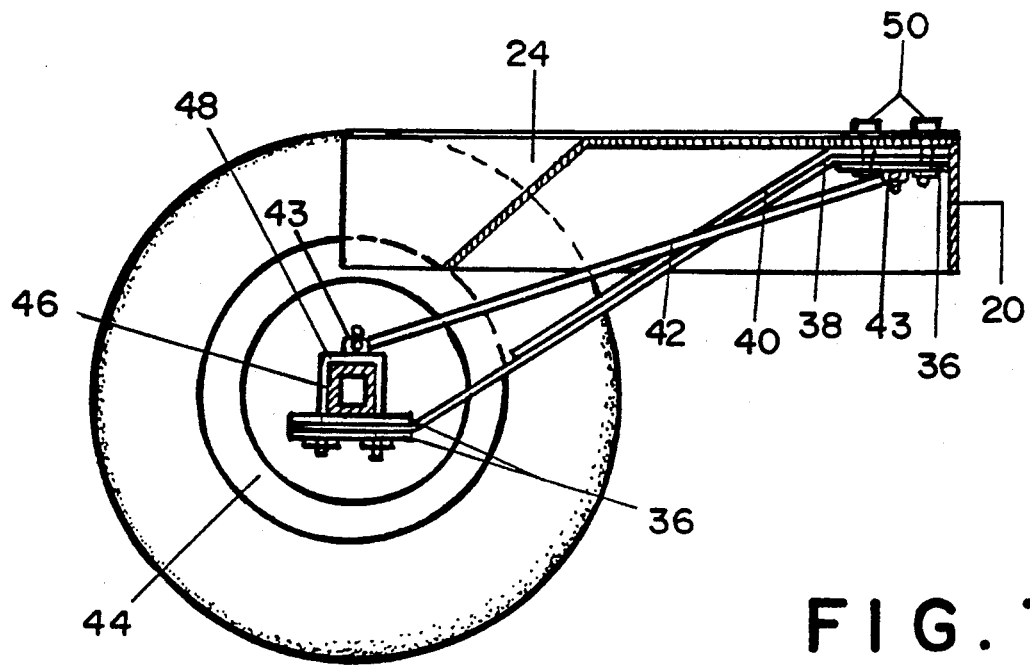
FIG. 7 depicts a cross section of the main frame with details of the springs, wheels, axles, and safety link/stabilizer.
Figure 8:
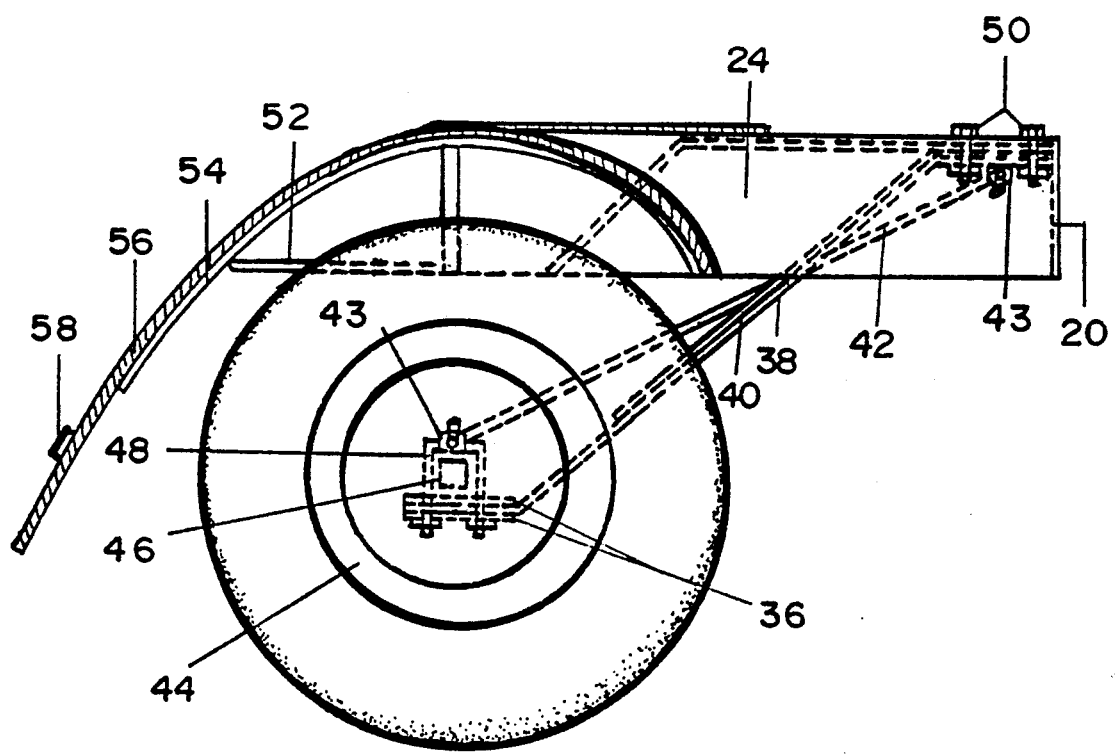
FIG. 8 shows an outside view of the fender and fender cover details, frame, wheels, and safety link/stabilizer.

FIGS. 7 and 8 are detailed views of the suspension, wheels and axle, and fender construction, as related to the main frame of the miniboat/camping trailer. The suspension of the miniboat/camping trailer is of the cantilever type consisting of two leaf springs 38 and 40 attached to main frame 20 and doubler 24 by two high strength machine bolts 50. The axle and wheel assemblies 44 and 46, being of common knowledge in the industry, are attached to the lower end of the cantilever springs 38 and 40 by "U" bolts 48 and backing plates 36. A safety link and stabilizer 42 is fabricated from steel rod bent at 90° on each end. The bent ends are slipped through fittings 43 which are welded to the bottom of the main frame 20 near the inboard center of the upper spring attachment, and to the top of the axle 46 inboard of the bottom cantilever spring attachment 48. After the safety links 42 protrude through the welded fitting 43, the safety link 42 are again bent 90° to hold them into the fittings 43. The wheels 44 are standard small trailer wheels and are interchangeable with wider flotation wheels of the same rim diameter and are purchased from wheel and tire manufacturers common to the industry.

Fenders 54 are rolled from lightweight sheet metal and welded to the main frame doubler and spring support 24. A metal bracket 52 is welded to the bottom rear of the main frame doubler 24 and extends back to the rear of the fender 54 for added support. The rolled metal fender 54 is covered by a large rubber "mudflap type" covering 56, that totally covers the metal fender 54 and extends past the rear of the metal fender to near the ground surface. The rubber like fender cover 56 is secured to the metal fender with small flat headed bolts.

A reflective tail light 58 is attached by pop rivets to the rear mud flap portion of the fender covering 56.

FIG. 9 exemplifies one of the embodiments of the miniboat/camping trailer which I call the "two canoe attachement" 60. Two oak rails with sufficient length to accommodate two canoes inverted side by side are bolted to the cargo bed rails 30 and 32 by two steel through-bolts 64 on each rail. Each "two canoe rail" 60 has 3 "rubber like" scuff pads 31 screwed to the rails at the points of contact with the two inverted canoes. Each "two canoe rail" 60 is fitted with an eye bolt 62 centered in the rail lengthwise and widthwise for binding the canoe tiedowns.

FIG. 10 depicts the snow ski attachment to the wheel assembly of the miniboat/camping trailer. The ski attachment shown in FIG. 11 is constructed of high impact fiberglass polymers. The ski 72 has a metal reinforcement 70 molded into the fiber glass at construction. A metal keel 74 is bolted to the back underside of the ski for directional stability. The keel 74 is constructed of steel angle iron cut to shape.

The ski 72 is attached to the wheel by a steel hoop 78 which is welded to the center ski reinforcement 70 and supported by steel supports 80, welded to the hoop 78 and the ski reinforcement 70. A ski tip control cable 68 is attached to the tip end of the ski 72 by a drilled hole in the reinforcement 70 and the cable 68 looped through the hole and clamped unto itself. The other end of the control cable 68 is attached to the front of the cargo bed 34 at the front lower corner of the bed by a threaded link 66.

OPERATION

FIGS. 1 and 2 show the miniboat/camping trailer with extended tongue 12 locked in the towing position for the conveyance of a canoe or small boat.

FIG. 5 shows the hitch assembly 10. The hitch assembly 10 is attached to the towing vehicle by the high strength steel bolt 10A through the hitch block 10B. This allows the horizontal flexibility between the trailer and the towing vehicle of 180°. The hitch block 10B is attached to the hitch clevis 10D by another steel bolt 10C allowing vertical movement between the trailer and the towing vehicle of 180°. The hitch clevis 10D is attached to the extendable miniboat/camping trailer tongue 12 by the steel bolt 10G and rubber shock cushions 10E and 10F, thus allowing 360° radial flexibility of the trailer to the towing vehicle. The three axis flexibility of this hitch is very necessary as this trailer is designed to be used extensively in rough off-road terrain where relationships of the trailer to the towing vehicle could be extreme.

FIG. 3 shows the trailer tongue 12 in its extended boat conveying position. The extended tongue 12 is locked into place by the spring safety locking pins 16 through the main frame tongue 18 of two drilled holes 14B through both tongues 12 and 18.

FIG. 4 shows the tongue 12 retracted as it would appear when the trailer would be used only for a utility purpose. The extendable tongue 12 is simply telescoped back into the main frame tongue 18, and the same locking pins 16 are reinserted through the matching holes of the two tongues at 14A. The main frame 20 is constructed in the shape of a box by welding the end doublers 24 to each end of the main frame 20. This small box frame allows for high strength with a minimum of weight for this rugged off-road use of this trailer. The main frame tongue 18 extends through the center of the main frame 20 and proceeds rearwardly to the back frame 22. Both frames are securely welded to the main frame tongue 18. The final rigid integrity of the miniboat/camping trailer is accomplished by the attachment of the expanded metal cargo bed 34 (FIG. 6) by four steel bolts at the corner of the main frame 20 and the back frame 22 into the four corners of the cargo bed. The four components; namely, the cargo bed 34, the main frame 20, the back frame 22 and the main frame tongue 18, act with synergism to create a lightweight but highly rigid and strong trailer. The cargo bed 34 serves as a container for camping items and provides a second function to support a small boat or canoe on its cargo bed rails 30 and 32. The canoe is inverted and lashed to the oak front and back rails 30 and 32. The rails 30 and 32 have the rubber like scuff pads 31, screwed into place where the inverted canoe comes in contact with the rails for protection to both the rails and the canoe.

FIGS. 7 and 8 show the details of the unique cantilever suspension system and the wheel assembly. The suspension system consists of two leaf springs 38 and 40 assembled in cantilever position. This allows for maximum support of the trailer and load with a minimum of parts and less weight than conventional spring systems, so that the trailer weight can be minimized to permit towing by small vehicles, such as ATV's and motorcycles. Backing plates 36 are used to spread over a larger area the stress at the spring attachment bolts 48 and 50.

The safety link and stabilizer 42 is attached to the main frame 20 and axle 46 at welded attachment fittings 43 for safety and stabilization of the axle and trailer should a spring failure occur.

The axle 46, wheels 44, and "U" bolts 48 are conventional to most trailers and are well known in the art.

The steel fenders 54 are rolled sheet metal to form a base for the attachment of large rubber outer fenders 56. These large outer fenders 56 afford maximum protection of the cargo area from mud and water, as the trailer will be used extensively in remote off-road terrain.

The fender 56 also serves for an extra mounting area for tail-light reflectors 58.

One embodiment of the miniboat/camping trailer is the "two canoe attachment" 60 (FIG. 9). The longer oak rails 60 support two canoes. They have steel through-bolts 64 to securely attach the rails 60 to the cargo rails 30 and 32 by drilled holes through the outer end of the cargo rails 30 and 32. This attachment allows families with a need for an additional canoe the added advantage of that option.

FIG. 10 discloses another possibility for an extended use of the miniboat/camping trailer in a snow environment.

The ski 72 in FIG. 11 is constructed with a steel mounting hoop 78. The hoop 78 with ski attached is slipped over the deflated tire and centered on the tire. The tire is then reinflated to bind the ski hoop 78 and ski 72 securely to the tire by the inflation process. The hoop 78 along with the two steel strap braces 80 are welded to the steel center ski stiffener 70 to give rigid integrity to the ski assembly. The ski tip control cable 68 is attached to the ski tip and the other end of the cable 68 to the outer front corners of the cargo bed 34 with a threaded link 66. This prevents the ski tip from dipping into soft snow and rotating under the trailer. The keel 74 is mounted under the back of the ski to maintain directional stability to the trailer while it is towed.

The foregoing description exemplifies to the reader how unique, rugged serviceable and desirable the miniboat/camping trailer would be to a host of sports enthusiasts from the touring motorcyclist, sports car owner, ATV backwoods sportsman, as well as the older or infirmed canoeists. The foregoing description discloses several embodiments or variations of the miniboat/camping trailer. However, these variations should not be construed as limitations on the scope of the invention. Other variations are possible. For example, one other variation would be the substitution of wide flotation tires for the narrow highway tires for the ATV backwoods version of the miniboat/camping trailer for increased flotation over marsh land or soft terrain.

Another embodiment of the miniboat/camping trailer is the use of a four section ⅜" plywood deck, assembled with the use of extruded aluminum framing pieces around the perimeter of the four plywood sections. The deck is fastened to the wood rails of the cargo bed and becomes a base for a two-man tent which allows the campers to tent up off the ground to avoid wet camping sites and varmints that tend to pilfer tent or ground sites. All parts of the plywood base are of such size so that when disassembled will stow in the trailer cargo bed and appropriate carriers on the side of the cargo bed.

All miniboat/camping trailers come equipped with an appropriate spare tire and wheel attached to the rear of the cargo bed in continental kit style.

Accordingly, the reader is requested to determine the scope of the invention by the appended claims and their legal equivalents, and not by the examples which have been given.

I claim:

1. A towed vehicle, comprising:
   a) a longitudinal frame having front and rear portions;
   b) means for securing said front portion to a towing hitch;
   c) a first member disposed transversely across an intermediate portion of said frame adjacent said rear portion and secured thereto, said first member and said longitudinal frame forming a cross configuration;
   d) first and second cantilever springs each having one end secured to respective ends of said first member and disposed toward said rear portion;
   e) an axle, including ground engaging means, secured to the other respective ends of said first and second cantilever springs;
   f) first and second stabilizer members each having one end secured to respective ends of said first member and disposed toward said rear portion and the other ends being secured to said axle;
   g) respective said first and second cantilever springs and said first and second stabilizer members forming and "X"-shaped configuration when viewed along an axis of said axle;
   h) a second member secured adjacent said end portion and disposed away from said first member; and
   i) a bed secured to said first and second members.

2. A towed vehicle as in claim 1, wherein:
   a) said one end of each of said stabilizer members is secured to the respective ends of said first member forwardly of respective said one end of said cantilever springs.

3. A towed vehicle as in claim 2, wherein:
   a) said other end of each of said stabilizer members is secured to said axle above respective said other end of each of said cantilever springs.

4. A towed vehicle as in claim 1, wherein:
   a) said securing means includes a retractable member disposed axially within said longitudinal frame; and
   b) said retractable member has extended and retracted positions relative to said longitudinal frame.

5. A towed vehicle as in claim 4, wherein:
   a) said retractable member has a rear portion; and
   b) said retractable member rear portion is disposed below said first member when in said retracted position.

6. A towed vehicle as in claim 1, wherein:
   a) means for permitting said securing means to pivot about three orthogonal axes.

7. A towed vehicle as in claim 1, wherein:
   a) fender means disposed over each of said wheels, said fender means is secured to said ends of said first member.

8. A towed vehicle as in claim 1, wherein:
   a) said ground engaging means include a pair of wheels.

9. A towed vehicle as in claim 1, wherein:
   a) said ground engaging means include a pair of skis.

10. A towed vehicle as in claim 1, wherein:
    a) said ground engaging means include a pair of wheels; and
    b) a pair of skis secured to respective said pair of wheels.

11. A towed vehicle as in claim 10, wherein:
    a) each of said skis includes a hoop for securing around respective said wheels.

12. A towed vehicle as in claim 1, wherein:
    a) said bed includes means for carrying a longitudinal load.

* * * * *